April 19, 1927.  R. D. MOWRY  1,625,047
INDICATOR FOR STORAGE BATTERIES
Filed May 23, 1925
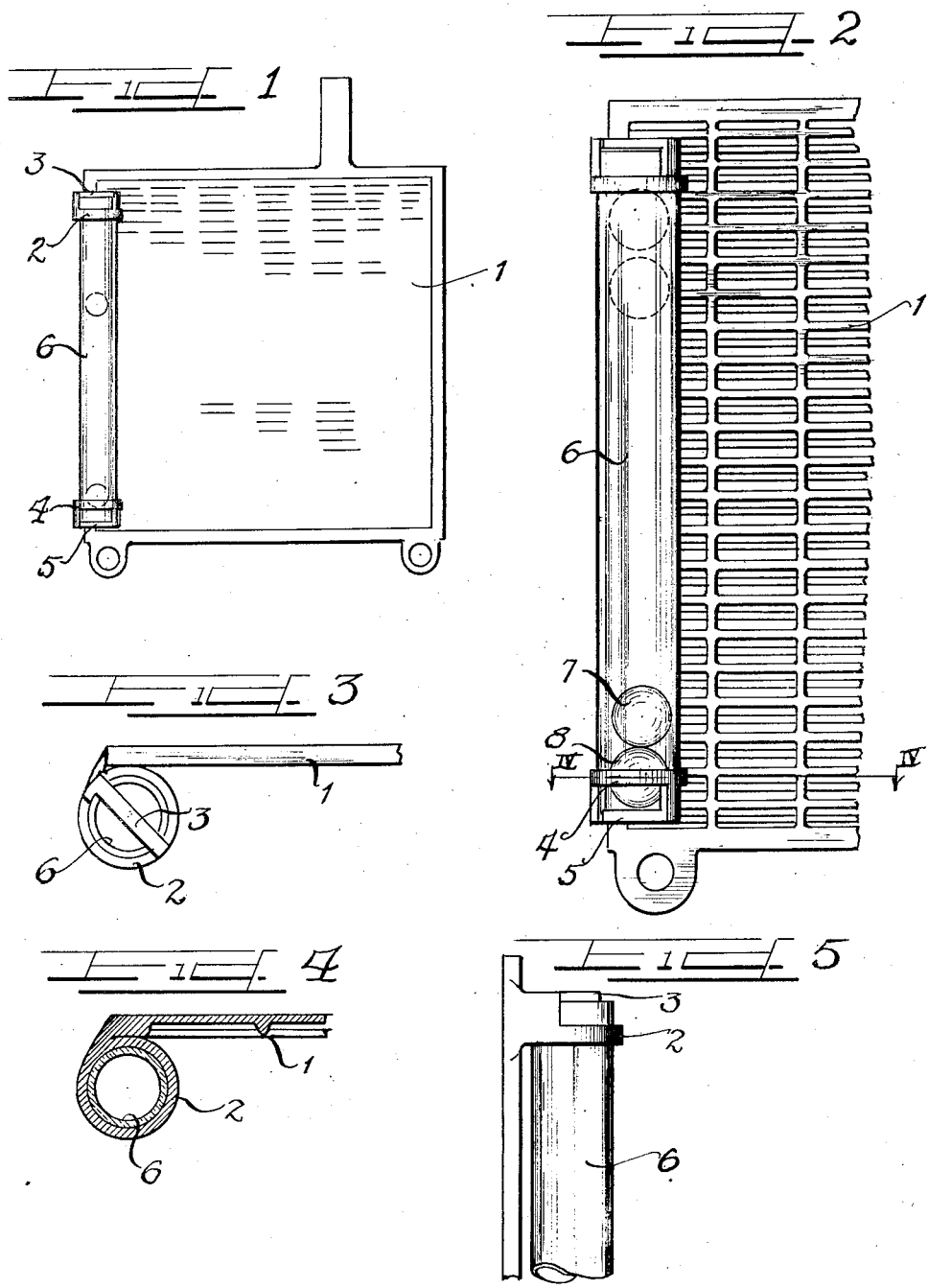

Patented Apr. 19, 1927.

1,625,047

UNITED STATES PATENT OFFICE.

ROBERT D. MOWRY, OF CHICAGO, ILLINOIS, ASSIGNOR TO UNIVERSAL BATTERY COMPANY, OF CHICAGO, ILLINOIS, A CORPORATION OF ILLINOIS.

INDICATOR FOR STORAGE BATTERIES.

Application filed May 23, 1925. Serial No. 32,245.

This invention relates to storage batteries in general and more particularly to indicating means therefor and has for its object the provision of an efficient device for indicating when the battery needs charging and when it is fully charged.

It is further an object of this invention to provide an indicator for batteries wherein the indicating means designed to sink or float according to the specific gravity of the fluid in the battery, is constrained to operate in a certain definite part of the battery where it may be readily seen.

It is also an important object of this invention to provide an indicator for batteries in which the indicating means is floated in a transparent tube within the battery.

Other and further important objects of this invention will be apparent from the disclosures in the specification and the accompanying drawings.

This invention (in a preferred form) is illustrated in the drawings and hereinafter more fully described.

On the drawings:

Figure 1 is an elevational view of a battery plate having secured thereto an indicating device embodying this invention.

Figure 2 is a fragmentary detail view of the same.

Figure 3 is a fragmentary top plan view of the same.

Figure 4 is a horizontal fragmentary section at the line IV—IV of Figure 2.

Figure 5 is a fragmentary side elevation of Figure 2.

As shown on the drawings:

Referring to Figure 1 there is shown a negative plate 1 of a storage battey which has secured thereto, in this instance integral therewith, an upper supporting annugral member 2 having an integral strap member 3. The plate 1 has also integrally secured thereto a lower supporting annular member 4 having a diametrical strap integral therewith and extending across the lower side thereof supported between the supporting members 2 and 4 is a cylindrical glass tube 6 which is open at either end.

Floatable within the tube 6 depending upon the specefic gravity of the fluid within the battery jar are two balls 7 and 8. The upper ball 7 is preferably colored and in this instance, has a specific gravity of 1.210. The lower ball 8 may be uncolored or of a color distinct from that of the upper ball the former, in this instance, having a specific gravity of 1.250. The specific gravity of the fluid in the battery will vary, such that at the "maximum charge" point, the lower ball 8 will float and at the "maximum discharge" point, the upper ball 7 will sink. Both balls will of course be sunk (full line position in Figure 2) when the "maximum discharge" point has been reached and both balls will be floated (dotted line position in Figure 2) when the "maximum charge" point has been reached. The specific gravities of the balls 7 and 8 may of course be varied depending upon the characteristics of the battery and fluid therein.

It will be obvious that by arranging the balls 7 and 8 in the manner described, I have provided an indicating device which will greatly facilitate the determination of the condition of the battery.

It will also be obvious that the construction of the device shown herein is simple, rugged, and such as may be economically manufactured.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

The combination with a storage battery plate, of spaced supporting brackets associated with one edge thereof, a transparent open end tube supported by said brackets and specific gravity indicating means in said tube.

In testimony whereof I have hereunto subscribed my name.

ROBERT D. MOWRY.